US010770747B2

(12) United States Patent
Lee et al.

(10) Patent No.: US 10,770,747 B2
(45) Date of Patent: Sep. 8, 2020

(54) LITHIUM SECONDARY BATTERY WITH NATURAL GRAPHITE ANODE

(71) Applicant: SK INNOVATION CO., LTD., Seoul (KR)

(72) Inventors: Jee Hee Lee, Daejeon (KR); Dock Young Yoon, Daejeon (KR); Sang Jin Kim, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 15/625,274

(22) Filed: Jun. 16, 2017

(65) Prior Publication Data

US 2017/0373315 A1 Dec. 28, 2017

(30) Foreign Application Priority Data

Jun. 22, 2016 (KR) ........................ 10-2016-0077938

(51) Int. Cl.

*H01M 10/052* (2010.01)
*H01M 4/133* (2010.01)
*H01M 4/587* (2010.01)
*H01M 4/02* (2006.01)

(52) U.S. Cl.

CPC ......... *H01M 10/052* (2013.01); *H01M 4/133* (2013.01); *H01M 4/587* (2013.01); *H01M 2004/021* (2013.01); *H01M 2004/027* (2013.01); *Y02T 10/7011* (2013.01)

(58) Field of Classification Search

CPC .... H01M 10/052; H01M 4/133; H01M 4/587; H01M 2004/027; H01M 2004/021; H01M 10/0525; Y02T 10/7011

See application file for complete search history.

(56) References Cited

U.S. PATENT DOCUMENTS

2013/0136988 A1* 5/2013 Tanaka .................. H01M 4/133 429/220
2014/0227588 A1* 8/2014 Kim ...................... H01M 4/366 429/188

FOREIGN PATENT DOCUMENTS

KR 10-2009-0016462 A 2/2009
KR 10-2009-0107740 A 10/2009
KR 10-1035099 B1 5/2011
KR 10-1057162 B1 8/2011
KR 10-2014-0132791 * 11/2014 ............ H01M 4/133

OTHER PUBLICATIONS

Machine translation of KR 10-2014-0132791, Woo et al., Nov. 19, 2014 (Year: 2014).*

* cited by examiner

*Primary Examiner* — Maria Laios
*Assistant Examiner* — Kwang Han
(74) *Attorney, Agent, or Firm* — The PL Law Group, PLLC

(57) ABSTRACT

A lithium secondary battery includes a cathode, an anode and a non-aqueous electrolyte. The anode includes an anode active material which includes a natural graphite, an average particle diameter ($D_{50}$) of the natural graphite being in a range from 9 μm to 14 μm, and an expansion rate of the anode represented is 17% or less.

7 Claims, No Drawings

LITHIUM SECONDARY BATTERY WITH NATURAL GRAPHITE ANODE

CROSS-REFERENCE TO RELATED APPLICATION

This application claims priority to Korean Patent Application No. 10-2016-0077938 filed on Jun. 22, 2016 in the Korean Intellectual Property Office (KIPO), the entire disclosure of which is incorporated by reference herein.

BACKGROUND

1. Field

Example embodiments relate to a lithium secondary battery. More particularly, example embodiments relate to a lithium secondary battery having enhanced power and life-time properties.

2. Description of the Related Art

Recently, mobile electronic and telecommunication devices such as a mobile phone, a camcorder, a laptop computer, etc., have become widespread as electronic and information technology industries have been rapidly developed. Accordingly, a lithium secondary battery has also been actively developed as a power source for the devices.

For example, the lithium secondary battery may be implemented as an eco-friendly power source in an electric vehicle, an uninterruptible power source, an electrically-driven tool, an artificial satellite, etc. Thus, the lithium secondary battery capable of being operated with improved capacity, power, stability and life-time may be required in the above-mentioned devices.

The lithium secondary battery includes an electrode assembly that may include a cathode and an anode each of which includes a current collector and an active material coated thereon, and a porous separation layer between the cathode and the anode. A cathode active material of the lithium secondary battery may include a transition metal compound, e.g., lithium cobalt oxide ($LiCoO_2$), lithium nickel oxide ($LiNiO_2$), lithium manganese oxide ($LiMnO_2$). An anode active material of the lithium secondary battery may include a crystalline carbon such as a natural graphite or an artificial graphite which may be highly tempered, a pseudo-graphite structure obtained by carbonizing a hydrocarbon or a polymer at a low temperature about 1,000° C. to 1,500° C., or an amorphous carbon-based material having a turbostratic structure.

A secondary battery using the conventional natural graphite as the anode active material may have a high electrode expansion ratio, and thus a life-time property of the battery may be deteriorated. When the artificial graphite is used as the anode active material for improving the life-time property, a power or output of the battery may not be improved compared to the battery including the natural graphite, and a resistance of the battery may be increased. When an active material mixture or an electrode of a high density is employed for increasing a capacity of the lithium secondary battery, the life-time property of the battery may be degraded.

For example, Korean Granted Patent Publication No. 10-1057162 discloses a metal-carbon composite-based anode active material having improved cycle property, however, fails to suggest measures to also increase power and life-time of the lithium secondary battery.

SUMMARY

Accordingly, it is an aspect of the present invention to provide a lithium secondary battery having improved power and life-time properties.

According to example embodiments, there is provided a lithium secondary battery including a cathode, an anode, and a non-aqueous electrolyte. The anode includes an anode active material which includes a natural graphite, an average particle diameter ($D_{50}$) of the natural graphite being in a range from 9 μm to 14 μm, and an expansion ratio of the anode represented by Equation 3 below is 17% or less.

$$\text{Expansion ratio of the anode (\%)}=100\times(T_2-T_1)/(T_1) \quad \text{[Equation 3]}$$

In the Equation 3 above, $T_1$ denotes a thickness of the anode before charging, and $T_2$ denotes a thickness of the anode after charging.

In some embodiments, the average particle diameter of the natural graphite may be in a range from 10 μm to 12 μm.

In some embodiments, a change ratio of particle density of the natural graphite represented by Equation 1 is 0.06 or less.

$$\text{Change ratio of particle density}=(Da-Db)/(a-b) \quad \text{[Equation 1]}$$

In the Equation 1 above, Da indicates a particle density (g/cc) measured when 2.5 g of the natural graphite is put in a hole having a radius of 1 cm and a pressure of 8 kN is applied for 5 seconds, Db indicates a particle density measured when a pressure of 1 kN is applied for 5 seconds, a is 8 kN and b is 1 kN.

In some embodiments, the change ratio of particle density of the natural graphite may be 0.04 or less.

In some embodiments, a half value width in a particle size distribution of the natural graphite may be 10 μm or less.

In some embodiments, a half value width in a particle size distribution of the natural graphite may be 9 μm or less.

DETAILED DESCRIPTION

According to example embodiments of the present inventive concepts, a lithium secondary battery may include a cathode, an anode and non-aqueous electrolyte, wherein the anode may include an anode active material formed of a natural graphite, an average particle diameter ($D_{50}$) of which may be in a range from about 9 μm to about 14 μm, and an electrode expansion ratio of the anode is about 17% or less. Accordingly, the lithium secondary battery may have enhanced power and life-time properties.

Hereinafter, some exemplary embodiments of the present inventive concepts will be provided. However, these embodiments are only given for illustrating the present inventive concepts, and are not to be construed as limiting the scope of the present invention.

Cathode Active Material

According to example embodiments, a cathode (e.g., a positive electrode) active material commonly used in an electro-chemical device may be employed. For example, a lithium intercalation material such as lithium manganese oxide, lithium cobalt oxide, lithium nickel oxide or a composite oxide from a combination thereof may be used.

Anode Active Material

According to example embodiments of the present inventive concepts, an anode (e.g., a negative electrode) active material may include a natural graphite, and an average particle diameter ($D_{50}$) of the natural graphite may be in a range from about 9 μm to about 14 μm.

The average particle diameter ($D_{50}$) used herein means a particle diameter at a volume ratio of 50% in a cumulative diameter distribution.

According to example embodiments, the average particle diameter ($D_{50}$) of the natural graphite may be in a range from about 9 μm to about 14 μm.

If the natural graphite is used as the anode active material, an output or power of the lithium secondary battery may be affected by the diameter of the natural graphite. In example embodiments, $D_{50}$ of the anode active material may be in a narrow range of about 9 μm to about 14 μm so that the lithium secondary battery may have enhanced power or output property. Particularly, $D_{50}$ may be in a range from about 10 μm to about 12 μm so that an excessive transformation of particles may be prevented even in a repetitive charging and discharging while obtaining enhanced power or output property.

In example embodiments, a change ratio of particle density of the natural graphite represented by Equation 1 below may be 0.06 or less. Within the range, a packing of active material particles may be facilitated to minimize pores between natural graphite particles so that an electrode expansion ratio of the anode may be reduced. Preferably, the change ratio of particle density may be 0.04 or less to further improve the packing of active material particles and suppress the electrode expansion ratio.

$$\text{Change ratio of particle density}=(Da-Db)/(a-b) \quad \text{[Equation 1]}$$

In the Equation 1 above, Da indicates a particle density (g/cc) measured when 2.5 g of the natural graphite is put in a hole having a radius of 1 cm and a pressure of 8 kN is applied for 5 seconds, Db indicates a particle density measured when a pressure of 1 kN is applied for 5 seconds, a is 8 kN and b is 1 kN.

In measuring the particle density using a powder resistivity measurement apparatus, 2.5 g of the anode active material is put in a hole having a radius of 1 cm, and a predetermined pressure is applied for 5 seconds, a volume is calculated by measuring a hole height under the predetermined pressure using a micro gauge and the particle density is obtained according to Equation 2 above.

$$\text{Particle density } (D)=m/V \quad \text{[Equation 2]}$$

In the Equation 2 above, m indicates a weight (g) of the anode active material under the predetermined pressure, and V indicates a volume (cc) of the anode active material under the predetermined pressure.

A method of obtaining the change ratio of particle density may not be specifically limited. For example, a half value width in a particle size distribution (PSD) of the natural graphite particles may be set as 10 μm or less to obtain the change ratio of particle density. Preferably, the half value width may be set as 9 μm or less so that the packing of active material particles may be enhanced by minimizing pores between the particles.

The half value width may be obtained by measuring a width of a lateral axis in a particle size distribution graph of the natural graphite particles when a value of a longitudinal axis is half a maximum height of the graph.

The natural graphite according to example embodiments may include any natural graphite commonly used in the lithium secondary battery. For example, the natural graphite may include amorphous, tabular, flake or spherical crystalline natural graphite. For example, a spherical high-crystallinity natural graphite may be used. When the natural graphite is spherical, an electrolyte impregnation may be easily realized to improve an efficiency of charging and discharging.

According to example embodiments, the natural graphite may be coated by a carbide layer at an edge portion thereof or an entire portion thereof. The carbide layer may include a low-crystallinity carbide layer which may be formed by coating a base carbon material with pitch, tar or a mixture thereof derived from a coal-based or petroleum-based material, and then sintering for carbonization. The low-crystallinity used herein indicates that a crystallinity of the carbide layer is less than that of the natural graphite. The carbide layer may fill micro-pores of the natural graphite to reduce a specific surface area and sites of an electrolyte dissociation. Thus, a charging/discharging efficiency and a cycle capacity may be improved so that the lithium secondary battery having enhanced life-time property may be obtained.

In the formation of the natural graphite coated with the carbide layer, the natural graphite having a particle shape, and the coal-based or petroleum-based carbon material may be mixed by a wet method or a dry method so that the carbon material may be converted into as a coating layer on a surface of the natural graphite. The natural graphite including the carbon-based coating layer thereon may be sintered to form the carbide layer at the edge portion or the entire portion thereof.

In some embodiments, the anode active material may further include a commonly used material without departing from the present inventive concepts. For example, the anode active material may further include lithium, a lithium alloy, lithium titanate, silicon, a tin alloy, cokes, an artificial graphite, a combusted organic polymer compound, a carbon fiber, etc. These may be used alone or a combination thereof. The amount of the material mentioned above may be properly adjusted, for example, may be less than about 10 weight percent.

Lithium Secondary Battery

According to example embodiments of the present inventive concepts, there is provided a lithium secondary battery including the cathode and anode active materials as described above.

The lithium secondary battery may include a cathode, an anode and a non-aqueous electrolyte.

For example, the cathode and anode active materials may each be mixed and stirred with a solvent and optionally with a binder, a conductive agent, a dispersive agent, or the like to obtain a mixture. The mixture may be coated and pressed on a metallic collector, and may be dried to form the cathode and the anode.

Non-limiting examples of the binder may include an organic-based binder such as vinylidenefluoride-hexafluoropropylene copolymer (PVDF-co-HFP), polyvinylidenefluoride (PVDF), polyacrylonitrile, polymethylmethacrylate, etc., or an aqueous binder such as styrene-butadien rubber (SBR) combined with a thickening agent such as carboxymethyl cellulose (CMC).

The conductive agent may include, e.g., a conductive carbon-based material commonly used in the related art.

The metal-based collector may include a metal having high conductivity and capable of being easily coated with a mixture of the cathode or anode active material without reactivity in a voltage range of the battery. Non-limiting examples of a cathode collector may include a foil formed from aluminum, nickel or a combination thereof. Non-limiting examples of the anode collector may include a foil formed from copper, gold, nickel, a copper alloy or a combination thereof.

A separator may be interposed between the cathode and the anode. The separator may include a conventional porous polymer film prepared from a polyolefin-based polymer such as ethylene homopolymer, propylene homopolymer, ethylene/butane copolymer, ethylene/hexene copolymer or ethylene/methacrylate copolymer, or the like. These may be used alone or in a combination thereof. The separator may include a non-woven fabric formed of a conventional porous non-woven fabric, a glass fiber of a high melting temperature, a polyethylene terephthalate fiber, etc. The separator may be applied to the battery by winding, laminating with the electrode or folding.

The non-aqueous electrolyte may include a lithium salt and an organic solvent. The lithium salt commonly used in a lithium secondary battery may be used without a particular limitation. The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

The non-aqueous electrolyte may be injected to an electrode structure including the cathode, the anode and the separator therebetween so that the lithium secondary battery may be obtained. A shape of the lithium secondary battery may not be particularly limited. For example, the lithium secondary battery may be prepared as a cylindrical type using a can, a polygonal type, a pouch type or a coin type.

According to example embodiments, an expansion ratio of the anode may be about 17% or less, preferably 16% or less. Within the above range of the expansion ratio, the lithium secondary battery may have improved life-time property. For example, a discharging capacity reduction may be in a range from about 1% to about 5% even though 500 cycles of charging/discharging are repeatedly performed.

The expansion ratio of the anode may be calculated according to Equation 3 below.

$$\text{Expansion ratio of anode (\%)}=100\times(T_2-T_1)/(T_1) \quad \text{[Equation 3]}$$

In the Equation 3, $T_1$ denotes a thickness of the anode before charging, and $T_2$ denotes a thickness of the anode after charging.

In example embodiments, an anode active material and a solvent may be mixed and stirred optionally with a binder, a conductive agent, a dispersing agent, etc., to form a mixture. The mixture may be coated on a metal collector and pressed, and an anode thickness may be measured to obtain the thickness of the anode before charging ($T_1$). The anode may be vacuum-dried for a day, and a cell may be prepared by combining with a cathode and a non-aqueous electrolyte. The cell may be charged (CC-CV 1.0C 4.2V 0.05C CUT-OFF). The cell may be disassembled in a dry room and an anode thickness may be measured to obtain the thickness of the anode after charging ($T_2$).

Hereinafter, exemplary embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

Preparation of Anode

A natural graphite was used as an anode active material. $D_{50}$ of the natural graphite was 10.5 μm, and a half value width of PSD was 8.4 μm. An aqueous binder in which styrene-butadiene rubber (SBR) and carboxymethyl cellulose (CMC) were mixed by a weight ratio of 5:5 was used as a binder, and carbon black was used as a conductive agent.

The anode active material, the conductive agent and the binder were mixed by a weight ratio of 93:5:2, and then dispersed in water to form an anode slurry. The anode slurry was coated on a copper thin film, dried and pressed with a pressure of 3.8 MPa to obtain an anode for a lithium secondary battery.

Fabrication of Lithium Secondary Battery

The anode prepared as described above, $LiNiMnCoO_2$ as a cathode active material, and CELGARD 2400 as a separator were assembled in an aluminum outer case to prepare a lithium secondary battery. A standard size of the battery was 4.5 mm (thickness)×64 mm (width)×95 mm (length), and a capacity of the battery was 2000 mAh.

Example 2

A lithium secondary battery was prepared by the same conditions as those of Example 1 except that $D_{50}$ of the natural graphite was 9.7 μm, and a half value width of PSD was 8.7 μm.

Comparative Example 1

A lithium secondary battery was prepared by the same conditions as those of Example 1 except that $D_{50}$ of the natural graphite was 12.3 μm, and a half value width of PSD was 9.4 μm.

Comparative Example 2

A lithium secondary battery was prepared by the same conditions as those of Example 1 except that $D_{50}$ of the natural graphite was 11.8 μm, and a half value width of PSD was 9.8 μm.

Comparative Example 3

A lithium secondary battery was prepared by the same conditions as those of Example 1 except that $D_{50}$ of the natural graphite was 10.6 μm, and a half value width of PSD was 10.4 μm.

Comparative Example 4

A lithium secondary battery was prepared by the same conditions as those of Example 1 except that $D_{50}$ of the natural graphite was 15.7 μm, and a half value width of PSD was 9.6 μm.

Experimental Example

1. Measuring Change Ratio of Particle Density of Anode Active Material

In measuring the particle density using a powder resistivity measurement apparatus, 2.5 g of each anode active material in Examples and Comparative Examples was put in a hole having a radius of 1 cm, and a pressure of 1 kN was applied for 5 seconds. A hole height under the pressure was measured using a micro gauge and a particle density was calculated according to Equation 2 below. A hole height of the same anode active material was measured again under a pressure of 8 kN for 5 seconds and a particle density was obtained from Equation 2. The particle densities obtained from the above were applied in Equation 1 to achieve a change ratio of particle density. The results are shown in Table 1 below.

$$\text{Change ratio of particle density}=(Da-Db)/(a-b) \quad \text{[Equation 1]}$$

In the Equation 1 above, Da indicates a particle density (g/cc) measured when 2.5 g of the natural graphite is put in a hole having a radius of 1 cm and a pressure of 8 kN is applied for 5 seconds, Db indicates a particle density measured when a pressure of 1 kN is applied for 5 seconds, a is 8 kN and b is 1 kN.

$$\text{Particle density } (D)=m/V \quad \text{[Equation 2]}$$

In the Equation 2 above, m indicates a weight (g) of an anode active material under a predetermined pressure, and V indicates a volume (cc) of an anode active material under the predetermined pressure.

2. Measuring Expansion Ratio of Anode

A thickness of each anode in Examples and Comparative Examples before charging was set as $T_1$. The anode was vacuum-dried for a day, and a cell including the anode was charged (CC-CV 1.0C 4.2V 0.05C CUT-OFF). The cell was disassembled in a dry room and an anode thickness was measured as $T_2$. An expansion ratio was calculated according to Equation 3 below.

$$\text{Expansion ratio of anode } (\%)=100\times(T_2-T_1)/(T_1) \quad \text{[Equation 3]}$$

In the Equation 3, $T_1$ denotes a thickness of the anode before charging, and $T_2$ denotes a thickness of the anode after charging.

3. Evaluation Power Property

Power properties of the batteries from Examples and Comparative Examples in a state of SOC (state of charge) 50% were measured by an HPPC (Hybrid Pulse Power Characterization by Freedom Car Battery Test Manual) method. The results are shown in Table 1 below.

4. Evaluation of Life-Time Property

Each cell of Examples and Comparative Examples was charged (CC-CV 1.0C 4.2V 0.05C CUT-OFF) and discharged (CC 1.0C 2.75V CUT-OFF) repeatedly (500 cycles), and then a discharge capacity at a $500^{th}$ cycle was calculated as a percent (%) ratio relative to a discharge capacity at a first cycle to evaluate a life-time property at a room temperature. The results are shown in Table 1 below.

TABLE 1

| | Change rate of particle density | Expansion rate of anode (%) | Discharge power (W/kg) | Life-time (%) (500 cycles) |
|---|---|---|---|---|
| Example 1 | 0.030 | 15 | 3345 | 98.1 |
| Example 2 | 0.033 | 17 | 3055 | 96.5 |
| Comparative Example 1 | 0.050 | 21 | 3060 | 87.2 |
| Comparative Example 2 | 0.054 | 22 | 3050 | 85.7 |
| Comparative Example 3 | 0.057 | 25 | 3010 | 80.3 |
| Comparative Example 4 | 0.040 | 17 | 2870 | 97.2 |

Referring to Table. 1, the lithium secondary batteries of Examples had improved life-time and high-power properties.

However, the lithium secondary batteries of Comparative Examples 1 to 3 showed degraded life-time properties, and the lithium secondary battery of Comparative Example 4 showed reduced discharging power.

What is claimed is:

1. A lithium secondary battery, comprising:
a cathode;
an anode; and
a non-aqueous electrolyte,
wherein the anode comprises an anode active material comprising a natural graphite, and an average particle diameter ($D_{50}$) of the natural graphite is in a range from 9 μm to 14 μm, and the amount of the natural graphite is 90 weight percent or more based on a total weight of the anode active material; and
the anode has an expansion ratio of 17% or less, and the expansion ratio is represented by Equation 3:

$$\text{Expansion ratio of the anode } (\%)=100\times(T_2-T_1)/(T_1) \quad \text{[Equation 3]}$$

wherein, in the Equation 3, $T_1$ denotes a thickness of the anode before charging, and $T_2$ denotes a thickness of the anode after a full charging,
a change ratio of particle density, represented by Equation 1, of the natural graphite is 0.06 or less:

$$\text{Change ratio of particle density}=(Da-Db)/(a-b) \quad \text{[Equation 1]}$$

wherein, in the Equation 1, Da indicates a particle density (g/cc) measured when 2.5 g of the natural graphite is put in a hole having a radius of 1 cm and a pressure of 8 kN is applied for 5 seconds, Db indicates a particle density measured when a pressure of 1 kN is applied for 5 seconds, a is 8 kN, and b is 1 kN.

2. The lithium secondary battery of claim 1, wherein the average particle diameter of the natural graphite is in a range from 10 μm to 12 μm.

3. The lithium secondary battery of claim 1, wherein the change ratio of particle density of the natural graphite is 0.04 or less.

4. The lithium secondary battery of claim 1, wherein a half value width in a particle size distribution of the natural graphite is 10 μm or less.

5. The lithium secondary battery of claim 1, wherein a half value width in a particle size distribution of the natural graphite is 9 μm or less.

6. The lithium secondary battery according to claim 1, wherein the natural graphite is at least partially coated with a carbide layer, the carbide layer having a crystallinity less than that of the natural graphite.

7. The lithium secondary battery according to claim 1, wherein a discharge capacity of the lithium secondary battery at a 500th cycle is 96.5% or more, relative to a discharge capacity at a first cycle.

* * * * *